US 6,561,387 B1

(12) United States Patent
Slawson (10) Patent No.: US 6,561,387 B1
(45) Date of Patent: May 13, 2003

(54) MATERIAL TRANSPORT SYSTEM AND APPARATUS FOR CONVEYING WATER SOFTENER SALT TO A BRINE TANK

(76) Inventor: Larry R. Slawson, 14136 North Rd., Fenton, MI (US) 48430

( * ) Notice: Subject to any disclaimer, the term of this patent is extended or adjusted under 35 U.S.C. 154(b) by 0 days.

(21) Appl. No.: 10/091,307

(22) Filed: Mar. 4, 2002

(51) Int. Cl.[7] .................................................. B67D 5/06
(52) U.S. Cl. ..................... 222/187.1; 141/95; 141/98; 141/333; 137/360
(58) Field of Search ............................. 222/180, 181.1, 222/181.2, 181.3; 141/95, 98, 331, 333, 334; 137/357, 358, 360

(56) References Cited

U.S. PATENT DOCUMENTS

| | | | | |
|---|---|---|---|---|
| 1,233,352 A | * | 7/1917 | Helcher | 141/345 |
| 1,690,735 A | * | 11/1928 | Lathrop | 141/250 |
| 4,485,831 A | * | 12/1984 | Ungerleider | 137/1 |
| 4,665,840 A | | 5/1987 | Yarnell | |
| 4,997,003 A | * | 3/1991 | Brennan | 137/147 |
| 5,105,861 A | | 4/1992 | Berger et al. | |
| 5,151,000 A | | 9/1992 | Geraghty et al. | |
| 5,296,202 A | | 3/1994 | Souers et al. | |
| 5,349,992 A | * | 9/1994 | Gallo et al. | 141/18 |
| 5,445,192 A | * | 8/1995 | Hansen | 141/2 |
| 5,706,873 A | * | 1/1998 | Benoit et al. | 141/98 |
| 5,906,293 A | | 5/1999 | Geiser et al. | |
| 5,996,852 A | | 12/1999 | Johnson | |
| 6,186,360 B1 | | 2/2001 | Becker et al. | |
| 2001/0038018 A1 | | 11/2001 | Bell et al. | |

* cited by examiner

Primary Examiner—J. Casimer Jacyna
(74) Attorney, Agent, or Firm—Dykema Gossett PLLC (57) ABSTRACT

The material transport system is for conveying water softener salt to a water softener brine tank located in the interior of a structure such as a house. A portable loading hopper is employed from outside of the house. The hopper is located adjacent and demountably attached to the exterior wall of the structure and has an open top and a bottom end. The hopper has converging side walls extending towards the bottom end and terminating in an annular collar. A coupling is secured to the collar with the coupling having a first extension. A 60° elbow is provided with a flange for receiving the first extension and is secured to the coupling. A tubular second extension is secured to the elbow and extends through the exterior wall into the interior of the structure. A feed tube having an enlarged end is located in the interior of the structure. The second extension extends into the enlarged end of the feed tube. Interlocking means are provided between the second tubular extension and the feed tube to prevent the loading hopper from turning when loaded with salt. A second 60° elbow is connected to the other end of the feed tube and a conduit connects the second elbow to the water softener brine tank.

20 Claims, 5 Drawing Sheets

MATERIAL TRANSPORT SYSTEM AND APPARATUS FOR CONVEYING WATER SOFTENER SALT TO A BRINE TANK

FIELD OF THE INVENTION

The present invention is directed to a material transport system for conveying water softener salt to a water softener brine tank located in the basement of a structure or house. It is contemplated that a wide number of homes or structures in a given locality will be modified to permit the use of a portable loading hopper detachably mounted to the exterior wall of the structure for introducing salt into the brine tanks. Once the brine tank has been loaded, the portable loading hopper and attached components are detached from the feed tube mounted in the exterior wall of the structure and moved to another job site. The feed tube opening in the exterior wall through which the salt enters the brine tank is closed by either an access door or by a plug.

BACKGROUND OF THE INVENTION

U.S. Pat. No. 5,996,852 entitled "Salt Conveying System for Water Softener", inventor Paul J. Johnson, discloses a system where a hopper is utilized to supply water softener salt to a household water softener system. The system includes a loading hopper having a removable lid that is secured to an adjacent wall of the structure. Salt is fed into the upper end of the loading hopper and travels through the hopper to the lower end of the hopper where a downwardly sloping gravity feed sleeve is connected to the loading hopper. The feed sleeve is formed from a non-corrosive material and extends from the loading hopper through the floors and walls of the structure to a lower level of the structure. At its lower end, the feed sleeve is connected to a storage hopper suspended in the lower level of the structure by a hanging framework attached to the underside of a floor of the structure located directly above the storage hopper. The feed sleeve is attached adjacent the upper end of the storage hopper, thereby allowing the salt to migrate through the storage hopper to a dispensing spout connected to the lower end of the storage hopper. The dispensing spout is connected to a feed mechanism located beneath the storage hopper. The feed mechanism includes a connecting sleeve forming the exterior of the mechanism and containing a feed sleeve used to selectively dispense the salt from the feed mechanism through a tank sleeve connected between the feed mechanism and the water softener brine tank.

The Johnson U.S. Pat. No. 5,996,852 also discloses a salt transport system where a hopper is connected to an exterior wall of the house by a mounting place secured between the loading hopper and the exterior wall. The loading hopper is formed of a non-corrosive material and includes a lid secured to the top end of the loading hopper by hinges. Attached to the lower end of the loading hopper is a feed sleeve which extends downwardly through its entire length and enters the house through a pair of feed sleeve openings in the exterior wall and a floor of the house. The feed sleeve is connected opposite the loading hopper directly to a brine tank located in the house adjacent to the foundation of the house. In both embodiments, the loading hopper is detachably connected to the wall on which it is mounted. In either embodiment, when the hopper is detached, an access door, such as a pivoted hinge cover, is used to close the feed sleeve opening.

SUMMARY OF THE PRESENT INVENTION

It is a feature of the present invention to provide an improved material transport system for conveying from the outside of a house, a water softener salt to a water softener tank located in the basement or at a lower level in the house.

It is another feature of the present invention to provide a material transport system for conveying water softener salt to a water softener brine tank comprising a portable loading hopper located adjacent and demountably attached to the exterior wall of the structure and having an open top and a bottom end, with the hopper having converging side walls extending towards the bottom end and terminating in an annular collar.

Still another feature of the present invention is to provide a material transport system of the aforementioned type wherein a coupling is secured to the collar of the hopper, with the coupling having a first extension and a 60° elbow is provided with a flange for receiving the first extension and secured to the coupling. A second tubular extension is secured to the elbow and extends through the exterior wall of the structure into the interior of the structure.

A further feature of the present invention is to provide a material transport system of the aforementioned type wherein a feed tube having an enlarged end is located in the interior of the structure, with the second extension extending into the enlarged end of the feed tube; interlocking means provided between the tubular second extension and the feed tube to prevent the loading hopper from turning when loaded with salt; a second 60° elbow is connected to the other end of the feed tube; and a conduit connecting the second elbow to the water softener brine tank.

A still further feature of the present invention is to provide a material transport system of the aforementioned type wherein the interlocking means comprises an elongated locking key located on the tubular second extension and a slot or key way is provided in the wall of the enlarged end of the feed tube; with the locking key being received in the slot or key way when the second extension is received in the feed tube to prevent the loading hopper from turning.

A still further feature of the present invention is to provide a material transport system of the aforementioned type wherein the interlocking means comprises an open slot provided in the wall of the second tubular extension and a bolt is carried by the wall of the enlarged end of the feed tube, with the bolt extending into the interior of the feed tube to form an abutment which engages the walls of the open slot when the tubular second extension is received in the feed tube to prevent the portable loading hopper from turning.

Another feature of the present invention is to provide a material transport system of the aforementioned type wherein a vertically extending gage rod is located in the brine tank, with the gage rod having on the upper end thereof an extension arm which extends through the exterior wall of the structure and is provided with an operating handle whereby a person outside of the structure can operate the handle, extension arm and gage rod to assist a person in determining when the brine tank is full of salt.

Still another feature of the present invention is to provide a material transport system of the aforementioned type wherein a second vertically extending gage rod, which floats on the salt, extends from the brine tank to assist a person adjacent the brine tank to determine the amount of salt remaining in the brine tank.

A further feature of the present invention is to provide a material transport system of the aforementioned type wherein an access door is provided on the exterior wall of the structure for closing the feed tube after the portable loading hopper and associated components have been detached from the feed tube.

A still further feature of the present invention is to provide a material transport system of the aforementioned type wherein after the portable loading hopper and attached components have been removed from the feed tube, a plug, provided with a handle, is inserted into the enlarged end of the feed tube to close it.

Another feature of the present invention is to provide a material transport system of the aforementioned type wherein an electrical circuit is provided with a pair of pressure switches and an electric light; with one of the pressure switches being a low voltage pressure switch which turns on the light when the level of salt in the brine tank is low and the other of the pressure switches turning of the light when the level of salt in the brine tank is high.

A still another feature of the present invention is to provide a material transport system of the aforementioned type wherein the electrical circuit includes a second light located exteriorly of the structure which is energized when the brine tank is full of salt.

A still another feature of the present invention is to provide a material transport system of the aforementioned type wherein the loading hopper and attached components are molded from a plastic material, as an example, polyvinyl chloride, to form an integral unit which is portable and detachable from the feed tube.

Finally, it is a further feature of the present invention to provide a material transport system of the aforementioned type that is simple in construction, efficient in operation and is easy to install and maintain.

Various other features, objects and advantages of the present invention would be apparent from the following description taken together with the drawings.

DETAILED DESCRIPTION OF THE INVENTION

Figure 1:
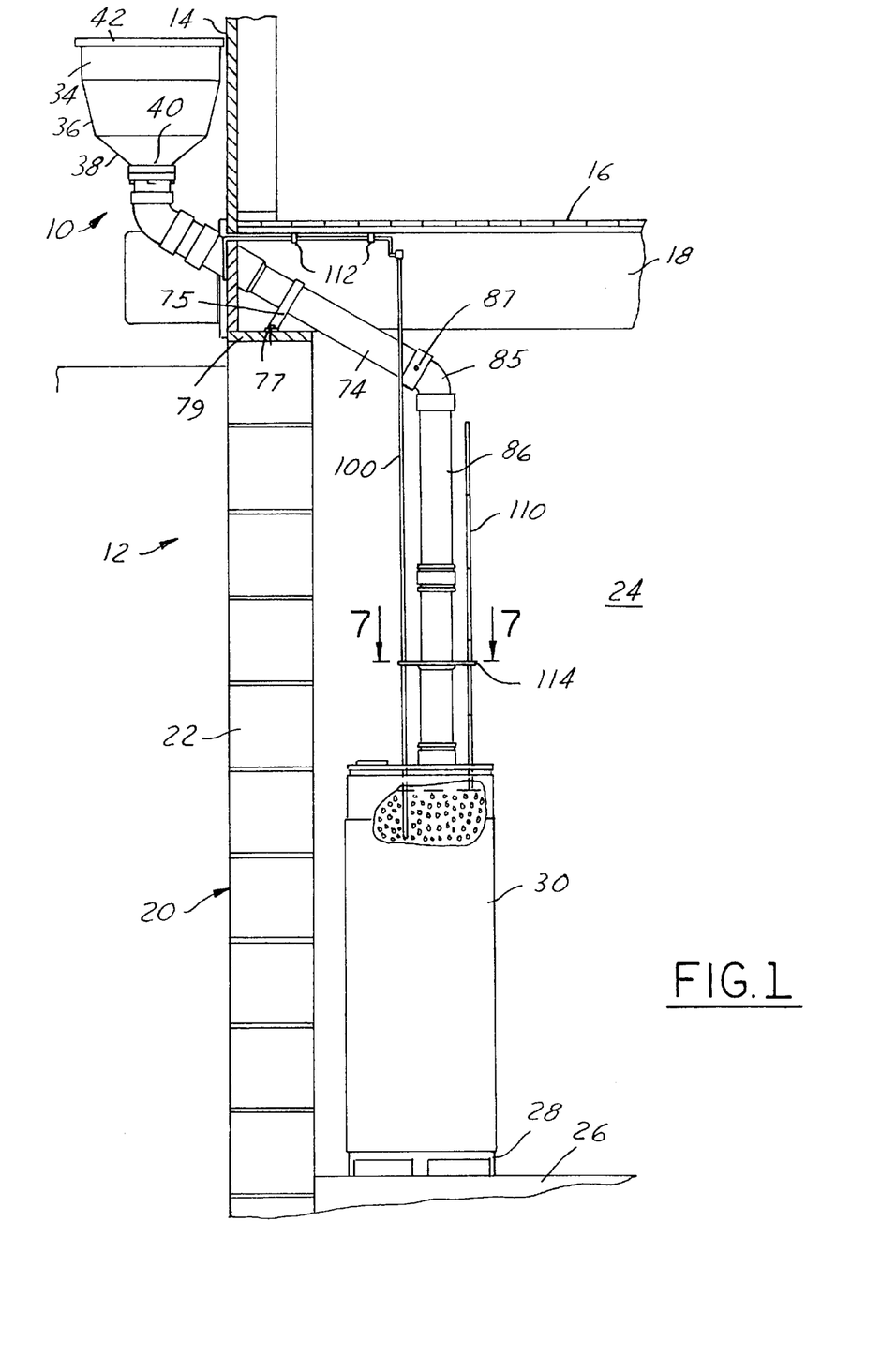
FIG. 1 is a vertical elevational view of a material transport system according to the present invention, with certain parts broken away and in section.

The material transport system 10 is shown in FIG. 1 as assembled in a building structure or house 12. The house 12 includes an exterior wall 14, a floor 16 usually at or near ground level which is supported by a plurality of I-beams 18. The structure or house 12 includes a foundation 20 formed by a plurality of vertically and horizontally arranged cement blocks 22. The ends of the I beams 18 are carried by the foundation 20.

The structure or house 12 further includes an interior space 24 beneath the floor 16 and above the basement or lower level floor 26. Located within the interior space 24 is a brine tank foundation 28 upon which is supported a brine tank 30 on the interior side of the foundation 20.

From time to time, it is necessary to supply water softener salt to the brine tank 30. The problem of loading the salt material into the brine tank 30 requires much effort. As an example, a brine tank of a water softener system can be loaded only by an individual or individuals carrying containers or bags of the material, typically 40–80 pound bags of salt, from the outside to the interior space 24 in the basement of the house 12. Thereafter, the bags of salt are dumped into the brine tank 30. It should be appreciated that this method may be beyond the capacity of large segments of the population due to the weight of the salt bags and the height of the tank. This problem has been addressed in the Johnson U.S. Pat. No. 5,996,582 by the utilization of a hopper located externally of the house so that the brine tank does not need to be continuously loaded by hand as the salt level decreases but rather the hopper is positioned higher than the bring tank to facilitate the dispensing of the salt.

The material transport system 10 includes a portable loading hopper 34 located adjacent and demountably attached to the exterior wall 14 of the structure 12. The hopper 34 has converging side walls 36 extending towards the bottom end of the hopper 34 and terminating in converging side walls 38. The side walls 38 terminate in an annual collar 40. The hopper 34 may be molded from a plastic material such as polyvinyl chloride or other suitable plastic material. The top end 42 of the hopper 34 is open. No cover or lid is provided.

Figures 2A, 2B, 3A, 3B, 3C:
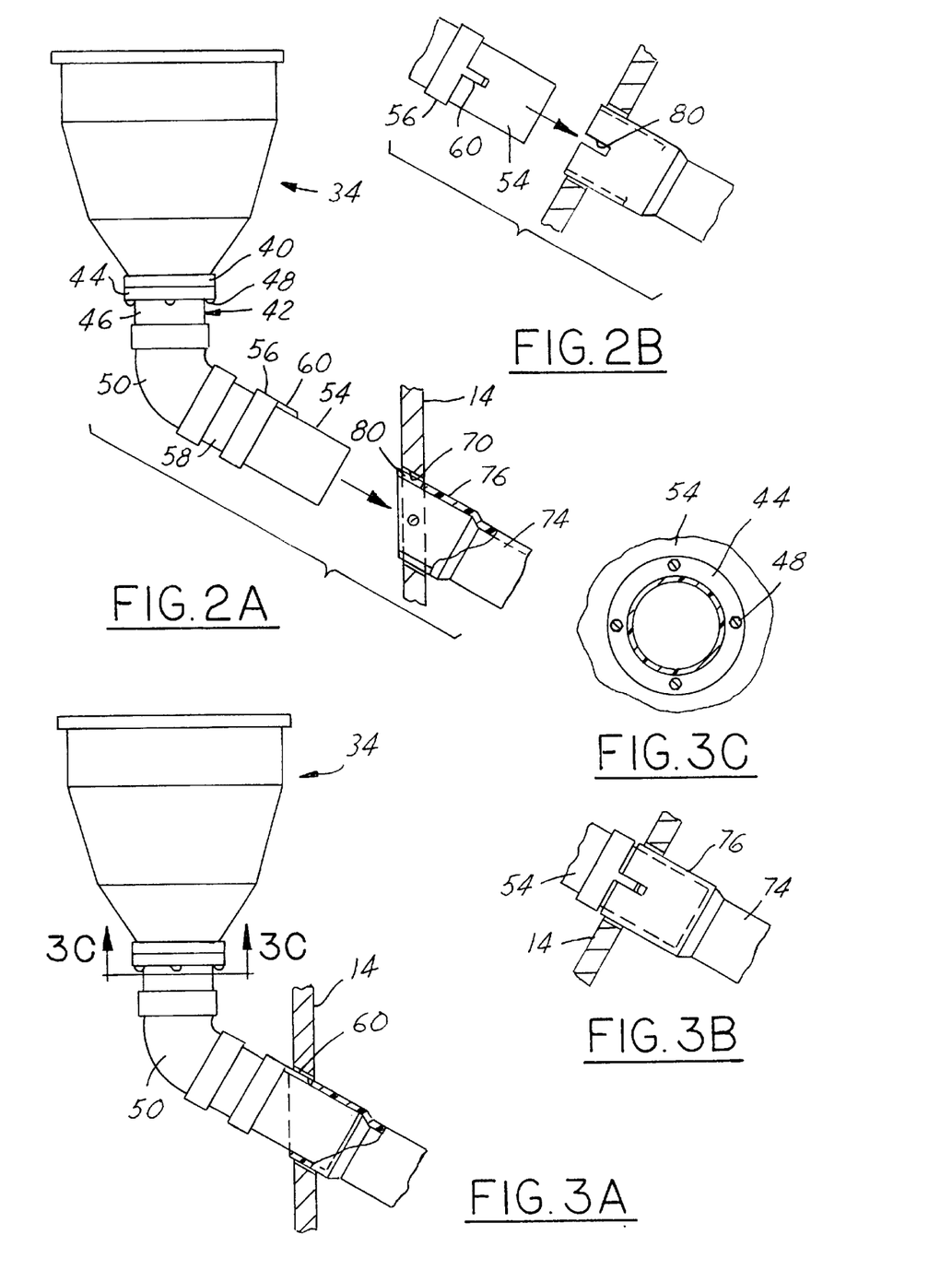
FIG. 2A is a fragmentary elevational view depicting the manner in which the portable hopper and connected components including the locking key is inserted into the enlarged end of the feed tube located in the wall of the structure, with the key being received in a slot provided in the wall of the enlarged portion of the feed tube.
FIG. 2B is a fragmentary plan view showing the manner in which the key carried by an extension is received in a slot provided in the enlarged head of the feed tube.
FIG. 3A is a fragmentary elevational view, partly in section, showing the key and keyway interlocking connection between the hopper and attached components and the feed tube.
FIG. 3B is a fragmentary plan view showing the interconnection between the key and key way of the extension and feed tube.
FIG. 3C is a sectional view taken on the line 3C—3C of FIG. 3A.

A coupling 42 having an annular flange 44 and a first extension 46 is provided. The coupling 42 is secured to the flange 40 of the hopper by a plurality of bolts 48. The bolts are spaced apart at 90° as shown in FIG. 3C. A 60° elbow 50 is provided, with the first extension 46 extending into one end of the elbow 50. A tubular second extension has an annular collar 56 with a first portion 58 extending into the other end of the elbow 50. The second extension 54 is provided with a key 60.

The portable loading hopper 34, coupling 42 with the first extension 46, elbow 50 and the second tubular extension 54 may be molded as a single unit from a plastic material such as polyvinyl chloride to form an integral unit which is portable and may be moved from job site to job site to feed salt into various brine tanks at different locations.

Each house or structure 12 with which the invention is to be utilized must be retrofitted whereby an opening 70 is cut in the side wall 14. The size of the opening may be 4 inches or greater and is cut at a downwardly inclined 30° angle (FIGS. 2A and 3A).

A feed tube 74 having an enlarged end 76 forms a receptacle for the hopper extension 54. The enlarged end 76 is wrapped with one or more layers of foam insulation to close the space between the enlarged end 76 and the opening 70 provided in the wall 14. The feed tube 74 is located in the interior space 24 of the structure 12. The feed tube 74 is held in place by a metal bracket 75 which has a pair of ends bent at 30° and which are secured by fasteners 77 to plate 79 located on top of the foundation 20.

Interlocking means are provided between the tubular second extension 54 and the feed tube 74 to prevent the loading hopper 34 from turning when the hopper is loaded with salt. The interlocking means consists of the key 60 provided on the extension 54 and a slot or key way 80 (FIG. 2B) provided in the wall of the enlarged end 76 of the feed tube 74. In use, the portable hopper 34 with the attached components including the extension 54 is inserted into the enlarged end 76 whereby the key 60 fits into the slot or key way 80 and thus prevents the hopper from turning when loaded with salt.

A second 60° elbow 85 (FIG. 1) is provided, with the feed tube 74 being sleeved and secured to the elbow 85 by a releasable screw 87 as shown in FIG. 1. A conduit 86 is provided in the form of a straight section of pipe or pipes connected together and extends from the other end of the elbow 85 to the brine tank 30 as best shown in FIG. 1.

The portable loading hopper 34 is demountably attached to the exterior wall 14 through the interlocking means provided by the key 60 and slot or key way 80 as illustrated in FIGS. 2A and 2B. When it is required to remove the hopper 34 and the associated components from the feed tube 74, a force is placed to the hopper 34 so as to separate the key 60 from the slot or key way 80.

Figures 4, 4A, 5, 7:
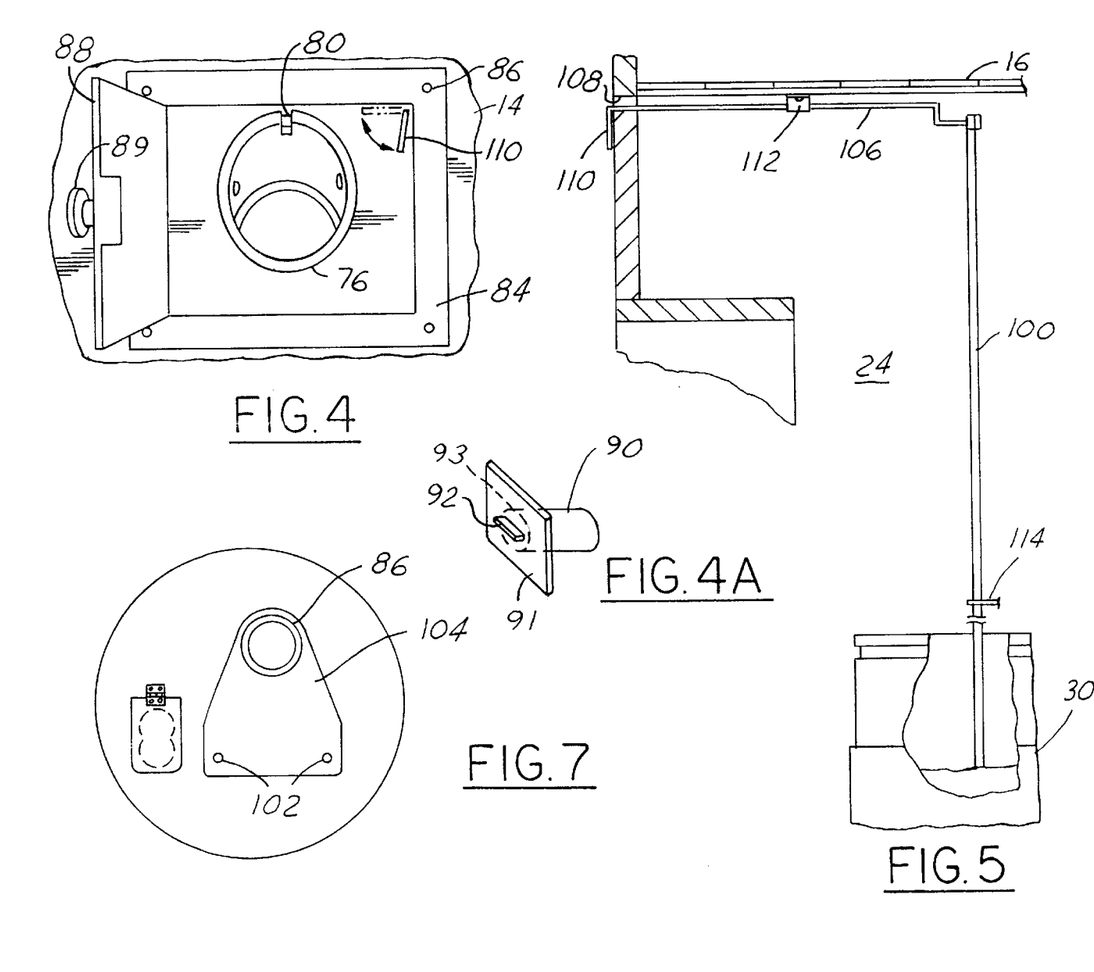
FIG. 4 is a front view of the opening in the enlarged head of the feed tube, with an access door shown in an open position and which is shut to close the opening.
FIG. 4A is a perspective view of a plug which is used to close the feed tube rather than the access door.
FIG. 5 is a fragmentary elevational view of the brine tank and gage rod including the extension arm and handle.
FIG. 7 is a view taken from above the brine tank along the line 7—7 of FIG. 1.

Once the hopper 34 and components are removed, it is necessary to close the opening to the feed tube 74. FIG. 4 illustrates the access door frame 84 secured to the exterior wall 14 by fasteners 86. The door frame 84 encloses the enlarged end 76 of the feed tube 74. An access door 88 provided with a handle 89 is pivotally mounted at one side of the frame 84. When the work has been completed, the access door 88 is closed so as to prevent access to the feed tube 74 until the door is opened. A suitable lock may be provided on the access door 88 to prevent unauthorized access to the feed tube 74.

FIG. 4A illustrates a one piece solid plug 90 with a rectangular face plate 91 which engages the frame 84 and covers the opening of the enlarged end 76. The plate 91 is provided with a handle 92. The plug 90 is cut or formed at a 30° angle and is made from a plastic material, such as P.V.C. The plug 90 is inserted into the enlarged end 76 of the feed tube 74 for closing same. The plug 90 has a rubber gasket 93 which forms a seal with the enlarged end 76 of the feed tube 74. The plug 90 may be used in place of the access door 88.

Figure 6:
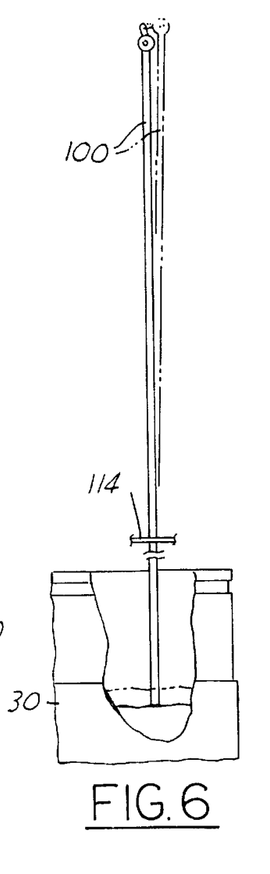
FIG. 6 is a fragmentary view of the gage rod and brine tank illustrated in FIG. 5.

It will be appreciated that the brine tank 30 may be loaded manually from the interior space 24 or preferably from the outside of the structure utilizing the portable hopper 34 and attachments. If the portable hopper 34 is utilized, it is required that the person loading the brine tank know when the tank 30 is full of salt. FIGS. 5 and 6 illustrate a vertically extending gage rod 100 which extends through an opening 102 in the brine tank lid 104. The gage rod 100 extends outwardly from the tank 30 through the interior space 24 to a point or area below the ground level floor 16. The upper end of the rod 100 is provided with an extension arm 106 which extends through an opening 108 provided in the wall 16 and is provided with a handle 110. The extension arm 106 extends through one or more eyelets 112. The rod 110 as shown in FIG. 4 may be rotated through 90° whereby a person can determine from the movement or lack of movement of the rod 110 whether or not the brine salt in the tank 30 is at the upper maximum level. This can be accomplished without the person having to go into the interior 24 of the structure to view the tank 30.

Figure 8:
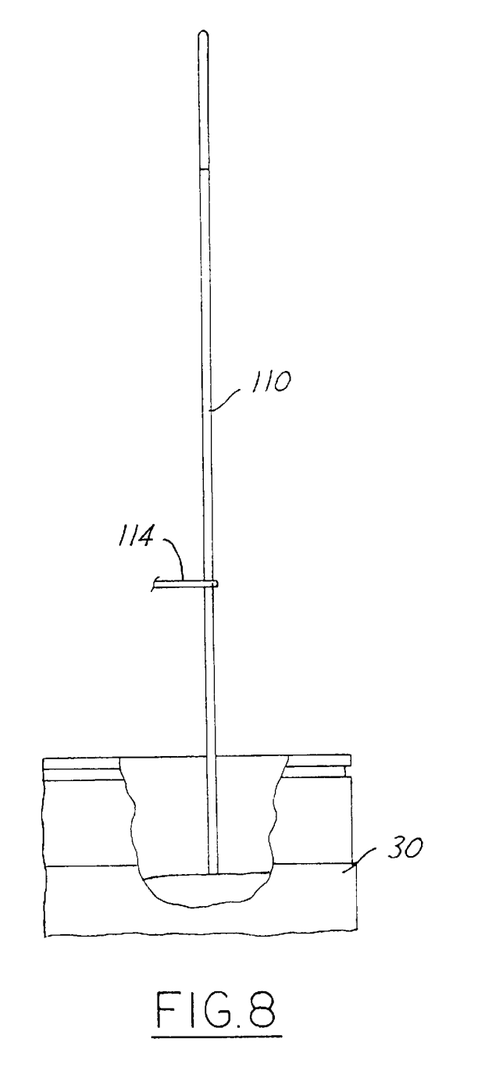
FIG. 8 is a fragmentary view of the brine tank, with parts broken away, with the gage rod floating on the salt.
Figure 9:
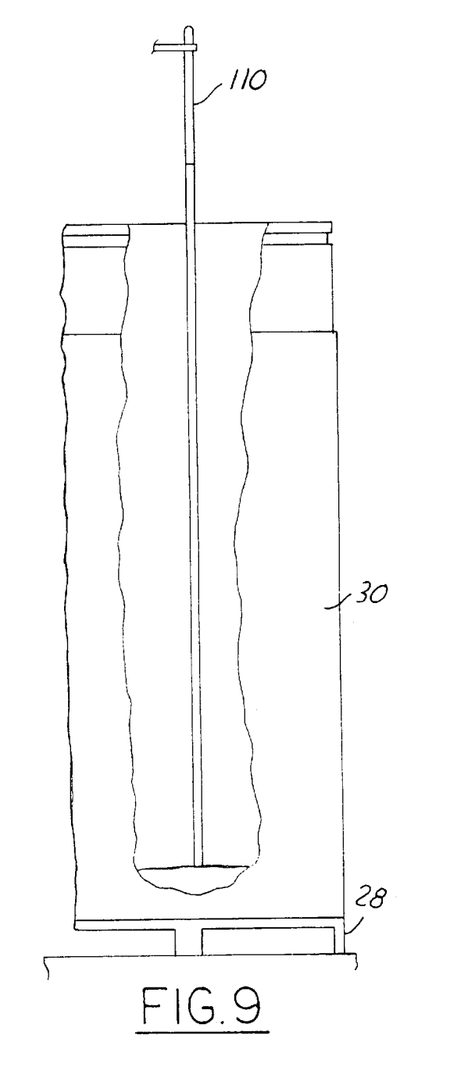
FIG. 9 is an elevational view of the brine tank, with parts broken away in order to show the gage rod floating on the salt in the bottom of the tank.

Referring to FIGS. 8 and 9, a second vertically extending gage rod 110 is illustrated. The rod 110 floats on the salt in the brine tank 30. When the level of salt decreases in the tank 30, the gage rod 110 decreases or lowers itself into the tank 30. With an appropriate scale provided on the gage rod, a person adjacent the brine tank 30 can determine very readily the amount of salt remaining in the tank 30. As noted in FIG. 1, the gage rod 100 and 110 are loosely connected by a bracket 114. The bracket 114 is in the form of a horse shoe and is made out of polyvinyl chloride (P.V.C.). It includes a pair of arms which are spaced apart to permit the bracket to snap around pipe 86. Such bracket 114 permits rod 110 to move vertically downwardly into the tank 30 as the level of salt in the tank 30 decreases. Thereafter the rod 110 must be reset by hand and a person vertically moves the rod 110 upwardly as the level of salt in the tank 30 increases.

Figures 10, 11, 12, 13:
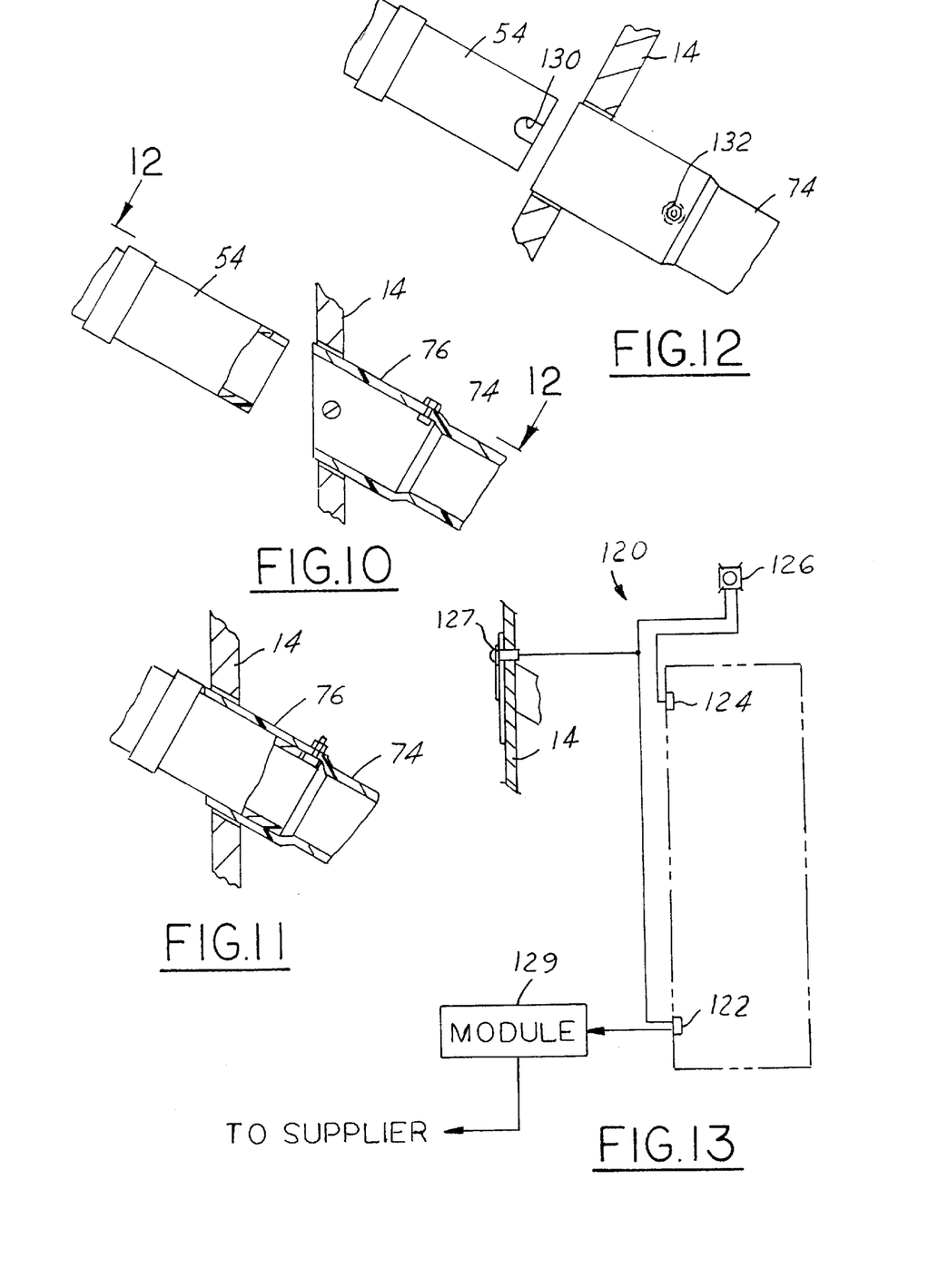
FIG. 10 is a fragmentary view of another way of connecting the hopper extension to the enlarged end of the feed tube by utilizing a slot provided in the extension and a bolt carried by the wall of the enlarged end of the feed tube.
FIG. 11 is an assembled view of the components illustrated in FIG. 10 and illustrating the bolt in the slot.
FIG. 12 is a top view of the components illustrated in FIG. 10 taken along the line 12—12 of FIG. 10.
FIG. 13 is a schematic diagram of the electrical circuit containing pressure switches.

An electrical circuit 120 is shown in FIG. 13. The circuit includes a pair of pressure switches 122 and 124 and an electric light 126. Pressure switch 122 is a low voltage pressure switch which, when actuated, turns on the light 126 when the level of salt in the brine tank is low. The other pressure switch 124 turns off the light 126 when the level of salt in the brine tank 30 is high. The electrical circuit 120 includes a second light 127 located exteriorly of the structure 12 which is energized when the brine tank 30 is full of salt. Thus, when the exterior light 127 is on it tells a person to stop placing salt in the hopper 34 since the content of the brine tank 30 is full.

The electrical circuit 120 includes an electrical module or programmer 129 which is connected to the home's telephone line. The low voltage pressure switch 122, when activated, turns on or activates the module 129. The module 129 contains a program effective, when activated to call or to dial a fax machine which is capable of sending to the salt delivery company or service or to any other location, the phone number or address of the particular home where a shortage of salt is occurring. Thus, the salt delivery service or company is alerted to the fact that it is time to deliver salt to the home.

Another embodiment of the present invention is illustrated in FIGS. 10–12 inclusive. Rather than using the key 60 and key way 80 as the interlocking means between the tubular second extension 54 and the feed tube 74 as illustrated in FIGS. 2A and 3A, modified interlocking means is illustrated. An open ended slot 130 (FIG. 12) is provided in the wall of the tubular second extension 54. The enlarged end 76 of the feed tube 74 is provided with a threaded bolt 132. The bolt 132 extends through the wall of the enlarged end of the tube 74 and extends into the interior thereof. Thus, when the second tubular extension 54 is directed into the enlarged end of the feed tube 74, the slot 130 and bolt 132 forms the interlocking means for connecting the second extension 54 to the enlarged end 76 of feed tube 74. The bolt 132 extends into the interior of the feed tube 74 to form an abutment which engages the open slot 130 when the second tubular extension 54 is received in the feed tube 74 to prevent the loading hopper 34 from turning.

From the foregoing description, various modifications and changes in the apparatus and in the method of operating such apparatus will occur to those skilled in the art, all such modifications or changes coming within the scope of the appended claims are intended to be included therein.

What I claim is:

1. A material transport system for conveying water softener salt to a water softener brine tank located in the interior of a structure comprising:
    a portable loading hopper located adjacent and demountably attached to the exterior wall of the structure and having an open top and a bottom end;
    said hopper having converging side walls extending towards said bottom end and terminating in an annular collar;
    a coupling secured to said collar, said coupling having a first extension;
    a 60° elbow provided with a flange receiving said first extension and secured to said coupling;
    a tubular second extension secured to said elbow and extending through the exterior wall into the interior of the structure;
    a feed tube having an enlarged end and located in the interior of the structure;
    said second extension extending into the enlarged end of said feed tube;
    interlocking means provided between said tubular second extension and said feed tube to prevent said loading hopper from turning when loaded with salt;
    a second 60° elbow connected to the other end of said feed tube; and
    a conduit connecting said last mentioned elbow to the water softener brine tank.

2. The material transport system defined in claim 1, wherein said interlocking means comprises an elongated locking key on said tubular second extension and a slot provided in the wall of the enlarged end of said feed tube;
    said locking key being received in said slot when said second extension is received in said feed tube to prevent said loading hopper from turning.

3. The material transport system defined in claim 1, wherein said interlocking means comprises an open slot provided in the wall of said tubular second extension and a bolt carried by the wall of the enlarged end of said feed tube;
    said bolt extending into the interior of said feed tube to form an abutment which engages said open slot when said tubular second extension is received in said feed tube to prevent said loading hopper from turning.

4. The material transport system defined in claim 1, a vertically extending gage rod is located in the brine tank, said gage rod having on the upper end thereof an extension arm which extends through the exterior wall of the structure and is provided with an operating handle whereby a person outside of the structure can operate the gage rod to assist in determining when the brine tank is full of salt.

5. The material transport system defined in claim 1, wherein a second vertically extending gage rod which floats on the salt extends from the brine tank to assist a person adjacent the brine tank to determine the amount of salt remaining in the brine tank.

6. The material transport system defined in claim 1, wherein an access door is provided on the exterior wall of the structure for closing the feed tube after the portable loading hopper, coupling with the first extension, 60° elbow with flange and said tubular second extension have been removed from the feed tube.

7. The material transport system defined in claim 1, wherein after said portable loading hopper and attached components have been removed from the feed tube, a plug with a handle is inserted into the enlarged end of said feed tube to close same.

8. The material transport system defined in claim 1, wherein an electrical circuit is provided with a pair of pressure switches and an electric light, one of said pressure switches being a low voltage pressure switch which turns on the light when the level of salt in the brine tank is low and the other of said pressure switch turning off the light when the level of salt in the brine tank is high.

9. The material transport system defined in claim 8, wherein said electrical circuit includes a second light located exteriorly of the structure which is energized when the brine tank is full of salt.

10. The material transport system defined in claim 1, wherein said loading hopper, said coupling with said first extension, said 60° elbow with said flange and said tubular second extension are molded from a plastic material to form an integral unit which is portable and detachable from said feed tube.

11. The material transport system defined in claim 10, wherein said plastic material is made from polyvinyl chloride.

12. The material transport system defined in claim 1, wherein said gage rod is marked with a scale to indicate the number of bags of salt in the brine tank.

13. The material transport system defined in claim 1, wherein a four inch hole at a downwardly inclined 30° angle is cut in the exterior wall of the structure to receive said tubular second extension which telescopes into the enlarged end of said feed tube.

14. The material transport system defined in claim 13, wherein a foam layer is wrapped around the exterior of the enlarged end of said feed tube to assist in closing the hole cut in the exterior wall of the structure.

15. The material transport system defined in claim 1, wherein said coupling is connected to the collar of said hopper by a plurality of equally spaced bolts.

16. A material transport system for conveying water softener salt to a water softener brine tank located in the interior of a structure comprising:
    a portable loading hopper located adjacent and demountably attached to the exterior wall of the structure and having an open top and a bottom end;
    said hopper having converging side walls extending towards said bottom end and terminating in an annular collar;
    a coupling secured to said collar, said coupling having a first extension;
    a 60° elbow provided with a flange receiving said first extension and secured to said coupling;

a tubular second extension secured to said elbow;

said extension having on the exterior thereof an elongated locking key;

a feed tube having an enlarged end and having a slot provided in the wall thereof;

said locking key being received in said slot when said tubular second extension is received in the enlarged end of said feed tube to prevent said loading hopper from turning when loaded with salt;

an elbow connected to the other end of said feed tube; and a conduit connecting said last mentioned elbow to the water softener brine tank.

17. The material transport system defined in claim 16, a vertically extending gage rod is located in the brine tank, said gage rod having on the upper end thereof an extension arm which extends through the exterior wall of the structure and is provided with an operating handle whereby a person outside of the structure can operate the gage rod to assist in determining when the brine tank is full of salt.

18. The material transport system defined in claim 16, wherein a second vertically extending gage rod which floats on the salt extends from the brine tank to assist a person adjacent the brine tank to determine the amount of salt remaining in the brine tank.

19. A material transport system for conveying water softener salt to a water softener brine tank located in the interior of a structure comprising:

a portable loading hopper located adjacent and demountably attached to the exterior wall of the structure and having an open top and a bottom end;

said hopper having converging side walls extending towards said bottom end and terminating in an annular collar;

a coupling secured to said collar, said coupling having a first extension;

a 60° elbow provided with a flange receiving said first extension and secured to said coupling;

a tubular second extension secured to said elbow;

an open slot provided in the wall of said tubular second extension; and a bolt carried by the wall of the enlarged end of said feed tubes;

said bolt extending into the interior of said feed tube and being received in said open slot when said tubular second extension is received in said feed tube to prevent said loading hopper from turning when loaded with salt;

said locking key being received in said slot when said tubular second extension is received in the enlarged end of said feed tube to prevent said loading hopper from turning when loaded with salt;

an elbow connected to the other end of said feed tube; and a conduit connecting said last mentioned elbow to the water softener brine tank.

20. The material transport system defined in claim 19, a vertically extending gage rod is located in the brine tank, said gage rod having on the upper end thereof an extension arm which extends through the exterior wall of the structure and is provided with an operating handle whereby a person outside of the structure can operate the gage rod to assist in determining when the brine tank is full of salt.

* * * * *